United States Patent [19]

Freadman

[11] Patent Number: 5,481,616
[45] Date of Patent: Jan. 2, 1996

[54] PLUG-IN SOUND ACCESSORY FOR PORTABLE COMPUTERS

[75] Inventor: Tommyca Freadman, New York, N.Y.

[73] Assignee: Sparkomatic Corporation, Milford, Pa.

[21] Appl. No.: 148,597

[22] Filed: Nov. 8, 1993

[51] Int. Cl.$^6$ .................................................. H04B 1/00
[52] U.S. Cl. .................................................. 381/90; 381/24
[58] Field of Search ................ 381/90, 24; 84/600–603; 364/705.05, 709.11, 424.01, 424.07

[56] References Cited

U.S. PATENT DOCUMENTS 5,148,490   9/1992   Draffen ..................................... 381/24

OTHER PUBLICATIONS

Creative Labs Sound Blaster Pro™ User Manual, Feb. 1992.

*Primary Examiner*—Stephen Brinich
*Attorney, Agent, or Firm*—Rosenman & Colin

[57] ABSTRACT

A portable computer is equipped with a sound capability by plugging a personal computer memory card international association (PCMCIA) card having an on-board master speaker module into a PCMCIA slot. A slave speaker module in wireless communication with the master speaker module may also be used to radiate sound.

13 Claims, 3 Drawing Sheets

PLUG-IN SOUND ACCESSORY FOR PORTABLE COMPUTERS

BACKGROUND OF THE INVENTION

1. Field of the Invention

This invention generally relates to portable computers, especially laptops and hand-held, personal digital assistant devices, and, more particularly, to a plug-in sound accessory for enabling such computers to radiate sounds.

2. Description of the Related Art

Multi-media conversion kits are available for enabling a computer to radiate sounds. Typically, such a kit includes an audio card insertable into an expansion slot of the computer, a pair of loudspeakers, and a pair of cables for hooking each loudspeaker up to the audio card. Hooking the speakers and the wires up correctly has proven to be beyond the capabilities of some computer operators. Also, sometimes there exist situations where the time for making an audio-visual presentation by computer is limited and, in those cases, the time required for hooking up the speakers and the wires is simply not available, even for an experienced computer operator.

Multi-media computers with factory built-in sound capability are also known. However, such built-in sound computers tend to be very bulky and unsuitable for making audio-visual computer presentations at multiple sites.

SUMMARY OF THE INVENTION

Objects of the Invention

Accordingly, it is a general object of this invention to readily equip a portable computer with a sound capability.

Another object of this invention is to provide a plug-in sound accessory that is simple, easy, convenient and rapid to install.

An additional feature of this invention is to convert conventional laptops and personal digital assistant devices to multi-media use.

Still another object of this invention is to convert a portable computer into a speakerphone.

Features of the Invention

In keeping with these objects and others which will become apparent hereinafter, one feature of this invention resides, briefly stated, in a sound accessory for a portable computer having a personal computer memory card international association (PCMCIA) slot. The accessory includes a PCMCIA card, also conventionally known as a flash card, the card being insertable into the slot. A master speaker means is mounted to the card, and is jointly movable with the card during insertion. Driver means is provided on at least one of the card and the master speaker means, for processing audio digital signals generated by the computer into master drive signals for driving the master speaker means to radiate sound therefrom.

In the preferred embodiment, the driver means also includes means for processing the audio digital signals into slave drive signals. A slave speaker means is provided remotely from the card. Means are provided for conducting the slave drive signals to the slave speaker means to radiate sound therefrom.

Preferably, the conducting means includes a wireless transmitter on the master speaker means, as well as a wireless receiver on the slave speaker means. Infrared transmitters and receivers are currently preferred.

The master speaker means includes a housing which may either be fixedly and permanently attached to the card, or may be mounted for movement relative to the card. The slave speaker means also includes a housing and, in the preferred embodiment, the housings for the master speaker means and the slave speaker means may be detachably interconnected for ease of portability.

A microphone means may be provided on the master speaker means for converting sound waves into microphone analog signals. A microphone interface means is provided on the card for converting the microphone analog signals into microphone digital signals for input into the computer. A telephone interface means may also be provided on the card in operative connection with the microphone interface means and the driver means. The telephone interface means converts the sound accessory to a speakerphone.

The portable computer may be a laptop having a display on a cover mounted for movement relative to a casing on which a keyboard is supported. The casing has a side wall through which the slot extends. The housing for the master speaker means exteriorly engages the side wall of the casing upon full insertion of the card into the slot.

In another embodiment, the portable computer is a hand-held, pen-controlled, personal digital assistant device having a casing on which a display and control keys are supported. Analogously, the casing has a side wall through which the slot extends, and the housing of the master speaker means exteriorly engages the side wall upon full card insertion.

The sound accessory is simply plugged into the slot to equip the computer with a sound capability. There are no cables to hook up. Installation is virtually immediate.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
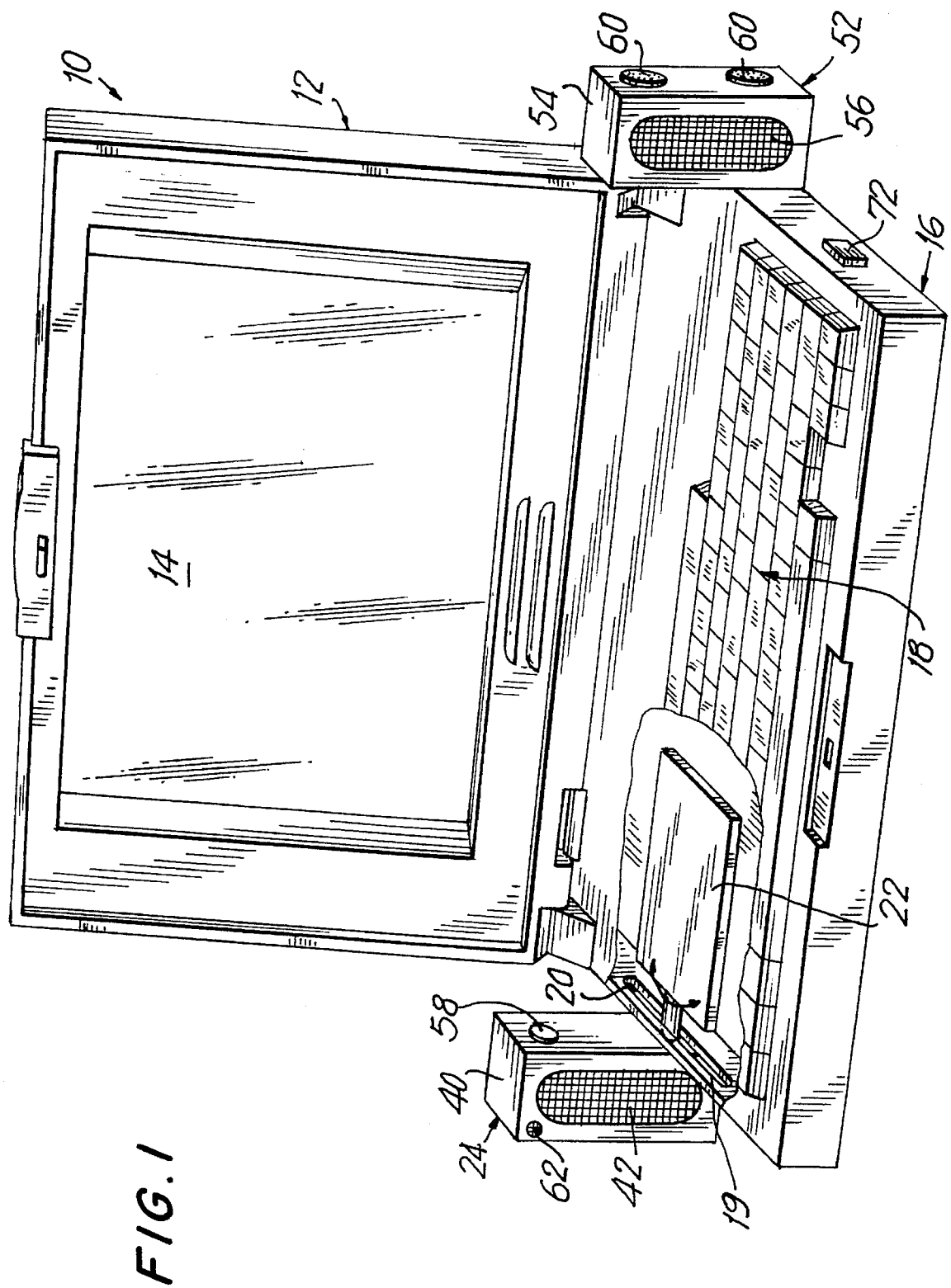
FIG. 1 is a perspective view of one embodiment of a sound accessory for use with a laptop computer in accordance with this invention.
Figure 3:
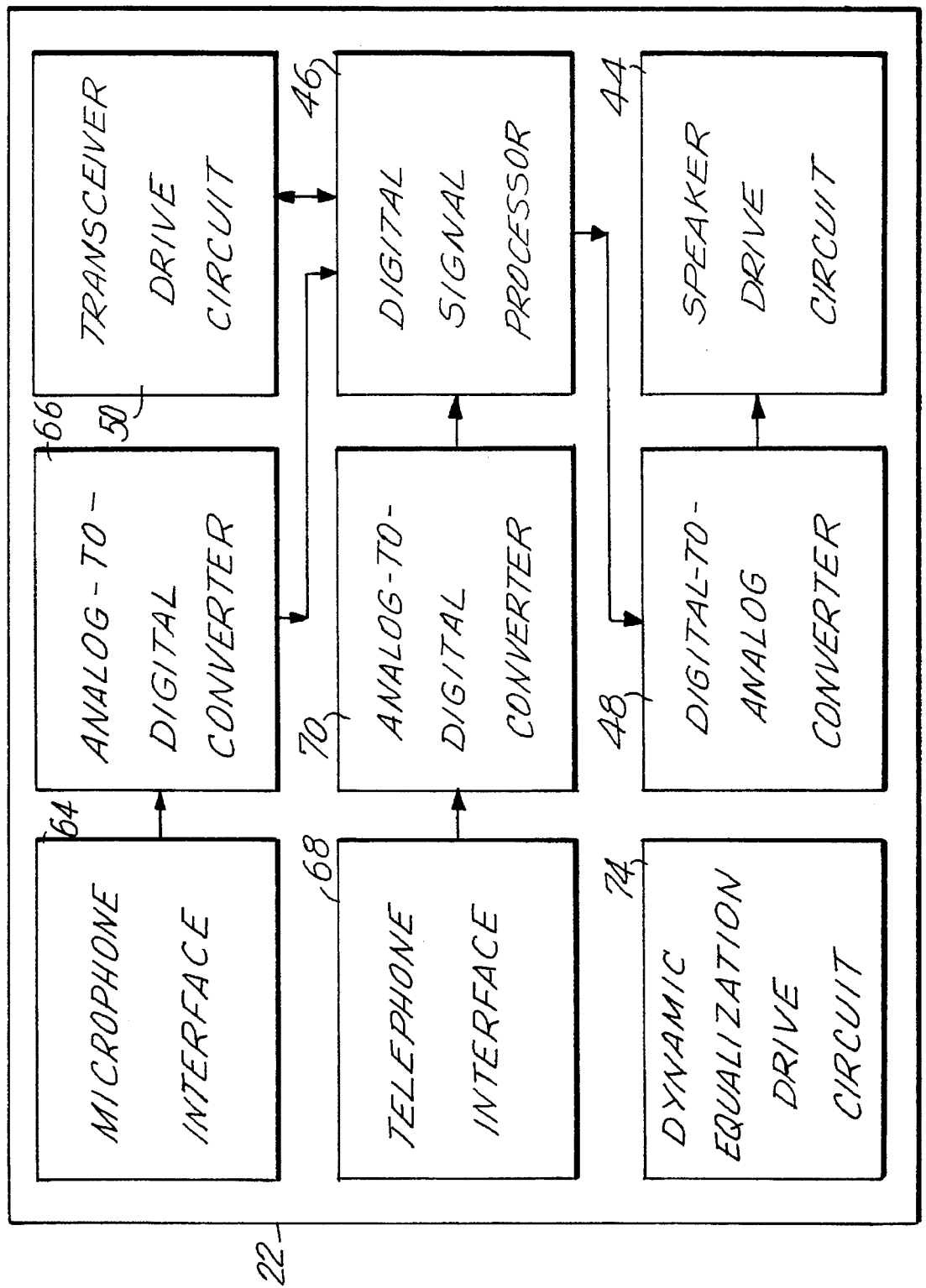
FIG. 3 is a block diagram of various circuits on a PCMCIA card used in the accessory of FIGS. 1 and 2.

FIG. 1 depicts a laptop computer 10 having a cover 12 on which a monitor display 14 is supported, and a casing 16 on which a keyboard 18 is supported. Typically, the cover 12 is hinged on the casing for pivoting movement between an open position (as illustrated) in which the cover 12 extends upwardly of the casing 16, and a closed position in which the cover overlies the keyboard. The casing has side walls, at least one of which, i.e., side wall 19, is provided with an industry-standard personal computer memory card international association (PCMCIA) slot 20 for receiving a conventional PCMCIA card, conventionally known as a flash card. It is known to insert a conventional flash card in a PCMCIA slot to equip a laptop computer with an accessory, e.g., a fax modem. As explained below, however, this invention proposes, among other things, adding additional circuitry (see FIG. 3) to a conventional flash card so as to obtain an enhanced PCMCIA card 22 operative, together with a master speaker module 24, to equip the computer with a sound capability.

Figure 2:
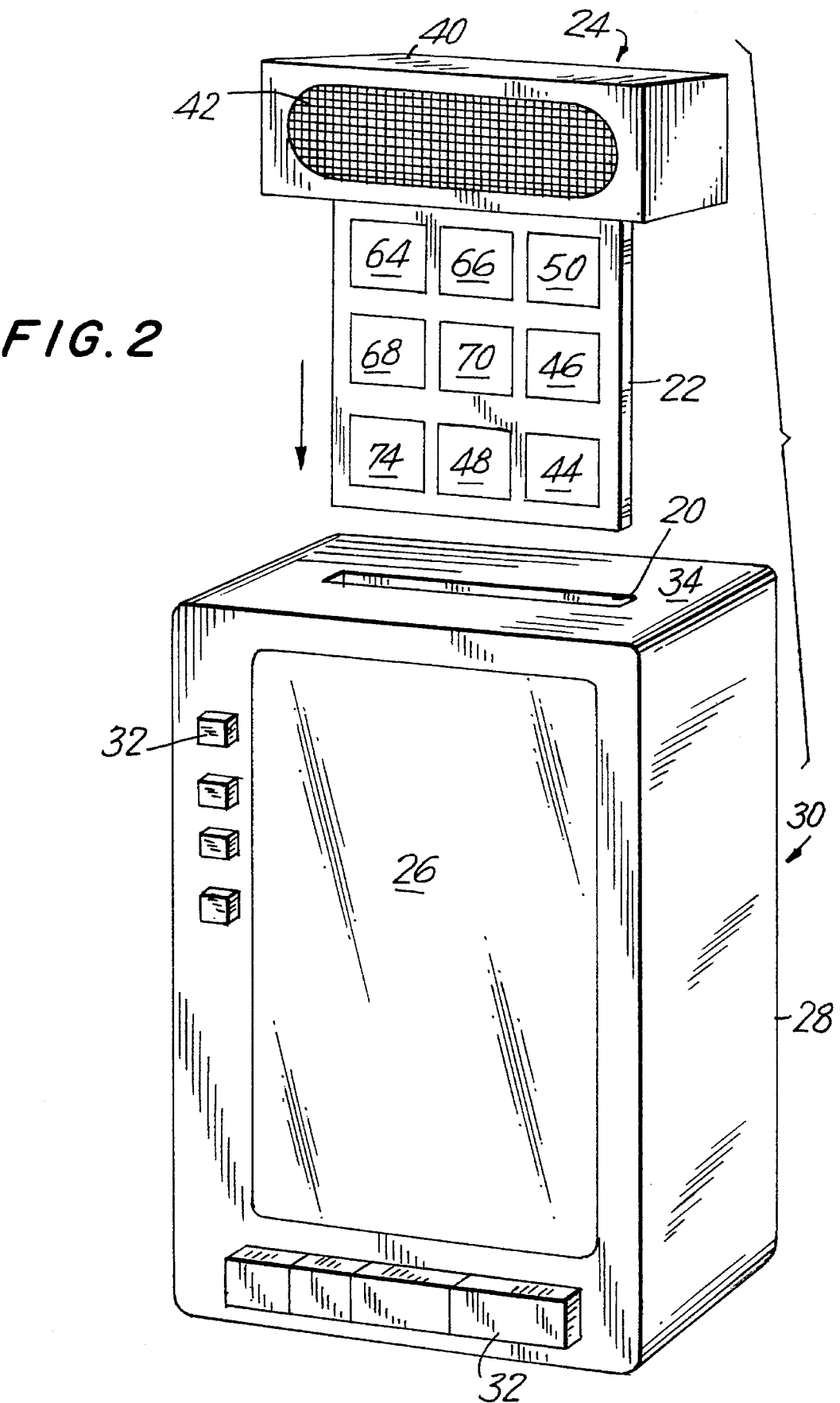
FIG. 2 is a perspective view of another embodiment of a sound accessory for use with a personal digital assistant device in accordance with this invention.

FIG. 2 depicts a hand-held computer 30, conventionally known as a personal digital assistant. Computer 30 has a casing 28 on which a pen-controlled screen 26 is supported, together with some control keys 32. A PCMCIA slot 20 extends through at least one of the side walls 34 of the casing, and receives the aforementioned enhanced card 22.

The master speaker module 24 includes a housing 40 in which an acoustic loudspeaker 42 is mounted. As shown in FIG. 2, the housing 40 is fixedly and permanently attached to card 22. In the preferred embodiment, the housing 40 is molded about one end of the card so as to obtain a one-piece construction. As shown in FIG. 1, the housing 40 is mounted on the card for pivoting movement relative thereto in either circumferential direction indicated by the double-headed arrow. Other housing mounting arrangements are contemplated by this invention but, in each case, the housing 40 is jointly movable with the card during insertion into slot 20.

A speaker drive circuit 44 is provided on the card 22, and includes an amplifier that is mounted either on the card 22 and/or within the housing 40. Audio digital signals are generated by the computer in response to a program and processed in a digital signal processor 46 and, in turn, by a digital-to-analog converter 48 prior to being conducted to the speaker drive circuit 44. The speaker drive circuit 44 is operative to generate master drive signals to enable the loudspeaker 42 to radiate sounds indicative of the audio digital signals.

In another embodiment, the digital signal processor 46 processes the audio digital signals generated by the computer program into slave drive signals which are conducted by a transceiver drive circuit 50 to a slave speaker module 52 located remotely from the card 22. The slave speaker module 52 includes a housing 54 in which an acoustic loudspeaker 56 is mounted. The transceiver drive circuit 50 is operative to conduct the slave drive signals to the slave speaker module which, in turn, receives the slave drive signals, converts the slave drive signals into analog signals, and drives the loudspeaker 56 to radiate sounds therefrom. The modules 24, 52 can be hard-wired together, but, it is preferable if a wireless transmission technique is used. For this purpose, an infrared transmitter 58 is provided on the housing 40, and a corresponding line-of-sight, infrared receiver is provided on the housing 54.

In order to use the sound accessory, the computer operator plugs the card 22 with the on-board master speaker module 24 into the slot 20 until the housing 40 engages the side wall 19. Set-up time is virtually immediate. If the operator wishes another sound source, for example, for listening to stereo sound, then the slave speaker module 52 is placed on the opposite side of the computer with the infrared received positioned in the direct line-of-sight of the infrared transmitter 58. The housings 40 and/or 54 may have to be moved into position.

In order to prevent the slave speaker module 52 from being misplaced, it is desirable to detachably connect the module 52 to the master speaker module 24. For this purpose, a pair of hooktype Velcro (trademark) fastener strips 60 is provided on housing 54, and a complementary pair of loop-type Velcro (trademark) fastener strips is provided on housing 40. Thus, prior to and after use, the housings 40, 54 are attached together. In order to use the slave speaker module, it is merely necessary to detach the same from the housing 40.

In a modified construction, a microphone 62 is mounted on the housing 40. Microphone 62 is operative for converting sound waves uttered by the operator into microphone analog signals. A microphone interface circuit 64 is provided on the card 22, and is operative, together with an analog-to-digital converter 66, for converting the microphone analog signals into microphone digital signals for input to the digital signal processor 46 and, in turn, to the computer. Thus, the sound accessory is not only useful for broadcasting sound, but also for inputting sound commands uttered by the operator to the computer.

In another modified construction, a telephone interface circuit 68 is provided on the card 22. The telephone interface circuit 68 operatively connects the microphone interface circuit 64 and the digital signal processor 46 through an analog-to-digital converter 70. The digital signal processor 46 is operatively connected to the speaker drive circuit 44 via converter 48 and, in turn, to the speaker 42 and, if desired, to the speaker 56 via the transceiver drive circuit 50. A non-illustrated telephone line is connected to a telephone jack 72 on the computer, thereby enabling the sound accessory to serve also as a speakerphone.

A dynamic equalization drive circuit 74 is preferably provided on the card 22 to equalize the various drive levels.

Electrical power connections are not shown so as to simplify the drawings. The computers 10, 30 are provided with on-board, rechargeable batteries which supply electrical power to all components. Since the loudspeakers 42, 56 are relatively inefficient and consume a relatively large amount of power, additional rechargeable batteries may be mounted within module housings 40, 54.

It will be understood that each of the elements described above, or two or more together, also may find a useful application in other types of constructions differing from the types described above.

While the invention has been illustrated and described as embodied in a plug-in sound accessory for portable computers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A sound accessory for a portable computer having a personal computer memory card international association (PCMCIA) slot, comprising:

a) a PCMCIA card insertable into the slot;

b) master speaker means mounted to the card, so as to move with the card during insertion of the card; and c) driver means on at least one of the card and the master speaker means, for processing audio digital signals generated by the computer into master drive signals for driving the master speaker means to radiate sound therefrom.

2. The accessory according to claim 1, wherein the driver means includes means for processing the audio digital signals into slave drive signals; and further comprising slave speaker means remote from the card; and also comprising means for conducting the slave drive signals to the slave speaker means to radiate sound therefrom.

3. The accessory according to claim 2, wherein each speaker means includes a housing having a loudspeaker mounted therein, and wherein each drive signal is an analog signal for driving each loudspeaker.

4. The accessory according to claim 3; and further comprising means for detachably connecting each housing to the other.

5. The accessory according to claim 2, wherein the conducting means includes transmitter means on the master speaker means for transmitting the slave drive signals to the slave speaker means, and receiver means on the slave speaker means for receiving the slave drive signals from the transmitter means.

6. The accessory according to claim 5, wherein the transmitter means and the receiver means include a wireless transmitter and a wireless receiver, respectively.

7. The accessory according to claim 1, wherein the master speaker means includes a housing fixedly and permanently attached to the card.

8. The accessory according to claim 1, wherein the master speaker means includes a housing mounted for movement relative to the card.

9. The accessory according to claim 1; and further comprising microphone means on the master speaker means for converting sound waves into microphone analog signals; and microphone interface means on the card for converting the microphone analog signals into microphone digital signals for input into the computer.

10. A sound accessory for a portable computer having an accessory card insertion slot adapted for receiving cards providing additional functions for the computer, said sound accessory comprising:

a) a sound accessory card insertable into the slot;

b) master speaker means mounted to the card so as to move with the card during insertion of the card;

c) driver means on at least one of the card and the master speaker means, for processing audio digital signals generated by the computer into master drive signals for driving the master speaker means to radiate sound therefrom;

d) microphone means on the master speaker means for converting sound waves into microphone digital signals for input into the computer; and e) telephone interface means on the card operatively connecting the microphone means and the driver means for converting the sound accessory to a speakerphone.

11. A sound accessory for a portable computer having an accessory card insertion slot adapted for receiving cards providing additional functions for the computer, said sound accessory comprising:

a) a sound accessory card insertable into the slot;

b) master speaker means mounted to the card so as to move with the card during insertion of the card; and c) driver means on at least one of the card and the master speaker means, for processing audio digital signals generated by the computer into master drive signals for driving the master speaker means to radiate sound therefrom, wherein the portable computer is a laptop having a display on a cover mounted for movement relative to a casing on which a keyboard is supported, and wherein the casing has a side wall through which the slot extends, and wherein the master speaker means includes a housing which exteriorly engages said side wall upon full insertion of the card into the slot.

12. A sound accessory for a portable computer having an accessory card insertion slot adapted for receiving cards providing additional functions for the computer, said sound accessory comprising:

a) a sound accessory card insertable into the slot;

b) master speaker means mounted to the card so as to move with the card during insertion of the card; and c) driver means on at least one of the card and the master speaker means, for processing audio digital signals generated by the computer into master drive signals for driving the master speaker means to radiate sound therefrom, wherein the portable computer is a hand-held, personal digital assistant device having a casing on which a pencontrolled display and control keys are supported, and wherein the casing has a side wall through which the slot extends, and wherein the master speaker means includes a housing which exteriorly engages said side wall upon full insertion of the card into the slot.

13. A sound accessory for a portable computer having an accessory card insertion slot adapted for receiving cards providing additional functions for the computer, said sound accessory comprising:

a) a sound accessory card insertable into the slot;

b) master speaker means mounted to the card so as to move with the card during insertion of the card; and c) driver means on at least one of the card and the master speaker means, for processing audio digital signals generated by the computer into master drive signals for driving the master speaker means to radiate sound therefrom.

* * * * *